(12) United States Patent
Li et al.

(10) Patent No.: US 9,397,917 B2
(45) Date of Patent: Jul. 19, 2016

(54) SYSTEM AND METHOD FOR ZONING IN SOFTWARE DEFINED NETWORKS

(71) Applicant: Huawei Technologies Co., Ltd., Shenzhen (CN)

(72) Inventors: Xu Li, Nepean (CA); Petar Djukic, Ottawa (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 14/530,332

(22) Filed: Oct. 31, 2014

(65) Prior Publication Data
US 2015/0200859 A1    Jul. 16, 2015

Related U.S. Application Data

(60) Provisional application No. 61/973,013, filed on Mar. 31, 2014, provisional application No. 61/926,099, filed on Jan. 10, 2014.

(51) Int. Cl.
| | |
|---|---|
| *G01R 31/08* | (2006.01) |
| *H04L 12/26* | (2006.01) |
| *H04L 12/24* | (2006.01) |
| *H04L 12/803* | (2013.01) |

(52) U.S. Cl.
CPC ........ *H04L 43/0876* (2013.01); *H04L 41/0823* (2013.01); *H04L 41/145* (2013.01); *H04L 47/125* (2013.01)

(58) Field of Classification Search
CPC ............ H04L 43/0876; H04L 41/0823; H04L 41/145; H04L 47/125
See application file for complete search history.

(56) References Cited

U.S. PATENT DOCUMENTS

| | | | |
|---|---|---|---|
| 6,370,142 B1 | 4/2002 | Pitcher et al. | |
| 6,636,721 B2 | 10/2003 | Threadgill et al. | |
| 9,038,151 B1 * | 5/2015 | Chua | H04L 45/42 709/223 |
| 2002/0178424 A1 | 11/2002 | Gupta et al. | |
| 2005/0050197 A1 | 3/2005 | Boyd et al. | |
| 2005/0256972 A1 | 11/2005 | Cochran et al. | |
| 2008/0096503 A1 | 4/2008 | Economy et al. | |
| 2009/0327902 A1 | 12/2009 | Bethune et al. | |
| 2013/0034104 A1 | 2/2013 | Yedavalli et al. | |

(Continued)

FOREIGN PATENT DOCUMENTS

| | | |
|---|---|---|
| CN | 102594697 A | 7/2012 |
| CN | 102882719 A | 1/2013 |
| CN | 103051565 A | 4/2013 |

OTHER PUBLICATIONS

International Search Report and Written Opinion received in Application No. PCT/CN15/10638 mailed Apr. 8, 2015, 10 pages.

(Continued)

*Primary Examiner* — Robert Wilson
(74) *Attorney, Agent, or Firm* — Slater Matsil, LLP

(57) ABSTRACT

An embodiment method of network zoning for a software defined network (SDN) includes determining a number, K, of zones according to at least one zone quantity parameter. Given K, a plurality of network nodes of the SDN are partitioned into K zones. The K zones are respectively assigned K SDN controllers. The K SDN controllers are configured to make traffic engineering decisions and carry out distributed network optimization for respective assigned network nodes among the plurality of network nodes.

27 Claims, 11 Drawing Sheets

(56) References Cited

U.S. PATENT DOCUMENTS

| | | | | |
|---|---|---|---|---|
| 2013/0250802 | A1* | 9/2013 | Yalagandula | H04L 12/28 370/254 |
| 2013/0283374 | A1* | 10/2013 | Zisapel | H04L 63/1407 726/22 |
| 2015/0188767 | A1* | 7/2015 | Li | H04L 41/12 370/254 |
| 2015/0188837 | A1* | 7/2015 | Djukic | H04L 47/70 709/226 |
| 2015/0200859 | A1* | 7/2015 | Li | H04L 41/0823 370/235 |

OTHER PUBLICATIONS

A.A. Abbasi and M. Younis, "A survey on clustering algorithms for wireless sensor networks," Computer Communications, vol. 30, No. 14-15, pp. 2826-2841, May 24, 2007.

S. Agarwal, M. Kodialam, and T.V. Lakshman, "Traffic Engineering in Software Defined Networks," Proc. IEEE Infocom, pp. 2211-2219, Apr. 14, 2013.

S. Arora, S. Rao, and U. Vazirani, "Geometry, Flows, and Graph-Partitioning Algorithms," Communications of the ACM, vol. 51, No. 10, pp. 96-105, Oct. 2008.

M. Chiang, S.H. Low, a.R. Calderbank, and J.C. Doyle, "Layering as Optimization Decomposition: A Mathematical Theory of Network Architectures," Proc. The IEEE, vol. 95, No. 1, pp. 255-312, Jan. 2007.

A. Chinchuluun, P.M. Pardalos, and H.-X. Huang, "Multilevel (Hierarchical) Optimization: Complexity Issues, Optimality Conditions, Algorithm," Advances in Applied Mathematics and Global Optimization, vol. 17, chapter 6, pp. 197-221, (no month) 2009.

J.C. Duchi, A. Agarwal, and M.J. Wainwright, "Dual Averaging for Distributed Optimization: Convergence Analysis and Network Scaling," IEEE Transactions on Automatic Control, vol. 57, No. 3, pp. 592-606, Mar. 2012.

U. Elsner, "Graph Partitioning-A Survey," Technische Universitat Chemnitz, Dec. 1997, 58 pages.

M. Fiduccia, "A Linear-Time Heuristic for Improving Network Partitions," In Proceedings of the 19th Design Automation Conference, pp. 175-181, Jun. 14, 1982.

"GNU Linear Programming Kit," GLPK—GNU Project—Free Software Foundation (FSF), <https://www.gnu.org/software/glpk/> stable release 4.54, Mar. 28, 2014, last accessed Feb. 25, 2015, 2 pages.

"Graph partition," Wikipedia: The Free Encyclopedia, Wikimedia Foundation, Inc.,<http://en.wikipedia.org/wiki/Graph partition>, Jan. 15, 2015, last accessed Feb. 25, 2015, 5 pages.

B. Hendrickson and R. Leland. "A Multilevel Algorithm for Partitioning Graphs," Proc. ACM/IEEE SC, Dec. 8, 1995, 2 pages.

G. Karypis and V. Kumar, "A fast and high quality multilevel scheme for partitioning irregular graphs," SIAM Journal on Scientific Computing, vol. 20, No. 1, pp. 359-392, (no month) 1999.

B.W. Kernighan and S. Lin, "An Efficient Heuristic Procedure for Partitioning Graphs," Bell Systems Technical Journal, vol. 49, pp. 291-307, Sep. 30, 1969.

R. Krauthgamer, J. Naory and R. Schwartz, "Partitioning Graphs into Balanced Components," Proc. ACM-SIAM SODA, pp. 942-949, (no month) 2009.

C.-S. Li and W. Liao, "Software Defined Networks," IEEE Communications Magazine, vol. 51, No. 2, p. 113, Feb. 2013.

F. McSherry, "Spectral Partitioning of Random Graphs," In Proceedings of the 42nd IEEE Symposium on Foundations of Computer Science (FOCS), pp. 529-537, (no month) 2001.

"METIS—Serial Graph Partitioning and Fill-reducing Matrix Ordering," <http://glaros.dtc.umn.edu/gkhome/views/metis> Web. Feb. 25, 2015, 1 page.

S. Orlowski and R. Wessaly, "The Effect of Hop Limits on Optimal Cost in Survivable Network Design," Telecommunications Planning: Innovations in Pricing, Network Design and Management, pp. 151-166, Jun. 2006.

S. Schmid and J. Suomela, "Exploiting Locality in Distributed SDN Control," Proc. ACM HotSDN, pp. 121-126, Aug. 16, 2013.

E.K. Tabak, B.B. Cambazoglu, C. Aykanat, "Improving the Performance of Independent Task Assignment Heuristics MinMin, MaxMin and Sufferage," IEEE Transactions on Parallel & Distributed Systems, vol. 25, No. 5, pp. 1244-1256, May 2014, doi:10.1109/TPDS.2013.107.

J.Y. Yu and P.H.J. Chong, "A survey of clustering schemes for mobile ad hoc networks," IEEE Communications Surveys & Tutorials, 7(1): 32-48, Feb. 2005.

Danna, E., et al., "A Practical Algorithm for Balancing the Max-Min Fairness and Throughput Objectives in Traffic Engineering," 2012 Proceedings IEEE INFOCOM, Mar. 25-30, 2012, 9 pages.

International Search Report and Written Opinion of the International Searching Authority received in Patent Cooperation Treaty Application No. PCT/CN2014/094900 mailed Apr. 3, 2015, 12 pages.

Kernighan, B.W. et al., "An Efficient Heuristic Procedure for Partitioning Graphs," Bell Systems Technical Journal, vol. 49, Sep. 30, 1969, 18 pages.

Danna, et al., "A Practical Algorithm for Balancing the max-min Fairness and Throughput Objectives in Traffic Engineering," 2012 Proceedings IEEE INFOCOM, Date of Conference Mar. 25-30, 2012, pp. 846-854.

\* cited by examiner

SYSTEM AND METHOD FOR ZONING IN SOFTWARE DEFINED NETWORKS

This application claims the benefit of U.S. Provisional Application No. 61/973,013, titled "Creating Logical Zones for Hierarchical Traffic Engineering in Software Defined Networks," filed on Mar. 31, 2014 by Li et al., and U.S. Provisional Application No. 61/926,099, titled "System and Method for Zoning in a Software Defined Network," filed on Jan. 10, 2014 by Li et al., which applications are hereby incorporated herein by reference.

CROSS-REFERENCE TO RELATED APPLICATIONS

This application is related to the co-pending U.S. patent application Ser. No. 14/142,344, titled "Traffic Behavior Driven Dynamic Zoning for Distributed Traffic Engineering in SDN," filed on Dec. 27, 2013, assigned to the assignee hereof, and to the co-pending U.S. patent application Ser. No. 14/141,077, titled "Hierarchical Software-Defined Network Traffic Engineering Controller," filed on Dec. 26, 2013, assigned to the assignee hereof, which applications are hereby incorporated herein by reference.

TECHNICAL FIELD

The present invention relates generally to zoning approaches in software defined networks (SDNs) and, in particular embodiments, to a system and method for zoning.

BACKGROUND

Driven largely by smart phones, tablets, and video streaming, the amount of wireless data handled by wireless networks has risen markedly and is expected to continue to continue growing. In addition to the increasing volume of data, the number of devices connecting to wireless networks is expected to continue to grow exponentially, possibly reaching into the billions of devices. Different applications will place different requirements on the performance of future wireless networks. Future wireless networks are expected to be highly flexible, highly efficient, open, and customizable for customers and consumers.

SUMMARY OF THE INVENTION

An embodiment method of network zoning for a software defined network (SDN) having a plurality of network nodes includes determining a number, K, of zones according to at least one zone quantity parameter. Given K, the plurality of network nodes of the SDN are partitioned into K zones. The K zones are respectively assigned K SDN controllers. Each of the K SDN controllers is configured to make traffic engineering decisions and carry out distributed network optimization for network nodes partitioned into the respective zone.

An embodiment communication system includes a plurality of network nodes, a plurality of controllers, a zoning controller, and a master controller. A plurality of traffic flows traverse among the plurality of network nodes over links. A traffic engineering (TE) problem is defined for the traffic flows, links, and network nodes. The zoning controller is configured to determine a size of a subset of zone controllers selectable from the plurality of controllers. The zoning controller is further configured to select the subset of zone controllers. The zoning controller is further configured to heuristically partition the plurality of network nodes into zones and respectively assign the subset of zone controllers to the zones. The master controller is configured to decompose the TE problem into TE sub-problems corresponding to the zones. The subset of zone controllers are configured to respectively solve the TE sub-problems for the zones.

An embodiment zoning controller includes a network interface controller (NIC) and a processor. The NIC is couplable to a plurality of SDN controllers and a plurality of network nodes via a control plane. The plurality of network nodes is traversable by traffic flows over links via a data plane. A TE problem is definable for the plurality of network nodes, the traffic flows, and the links. The processor is configured to determine a size of a subset of zone controllers according to an expected TE complexity, a size of a network comprising the plurality of network nodes, and a traffic load comprising the traffic flows. The processor is further configured to select the subset of zone controllers from the plurality of SDN controllers according to a controller topology, a network topology, and the traffic load. The processor is further configured to partition a plurality of network nodes into zones and respectively assign the subset of zone controllers to the zones, where in some embodiments the partitioning is done heuristically.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
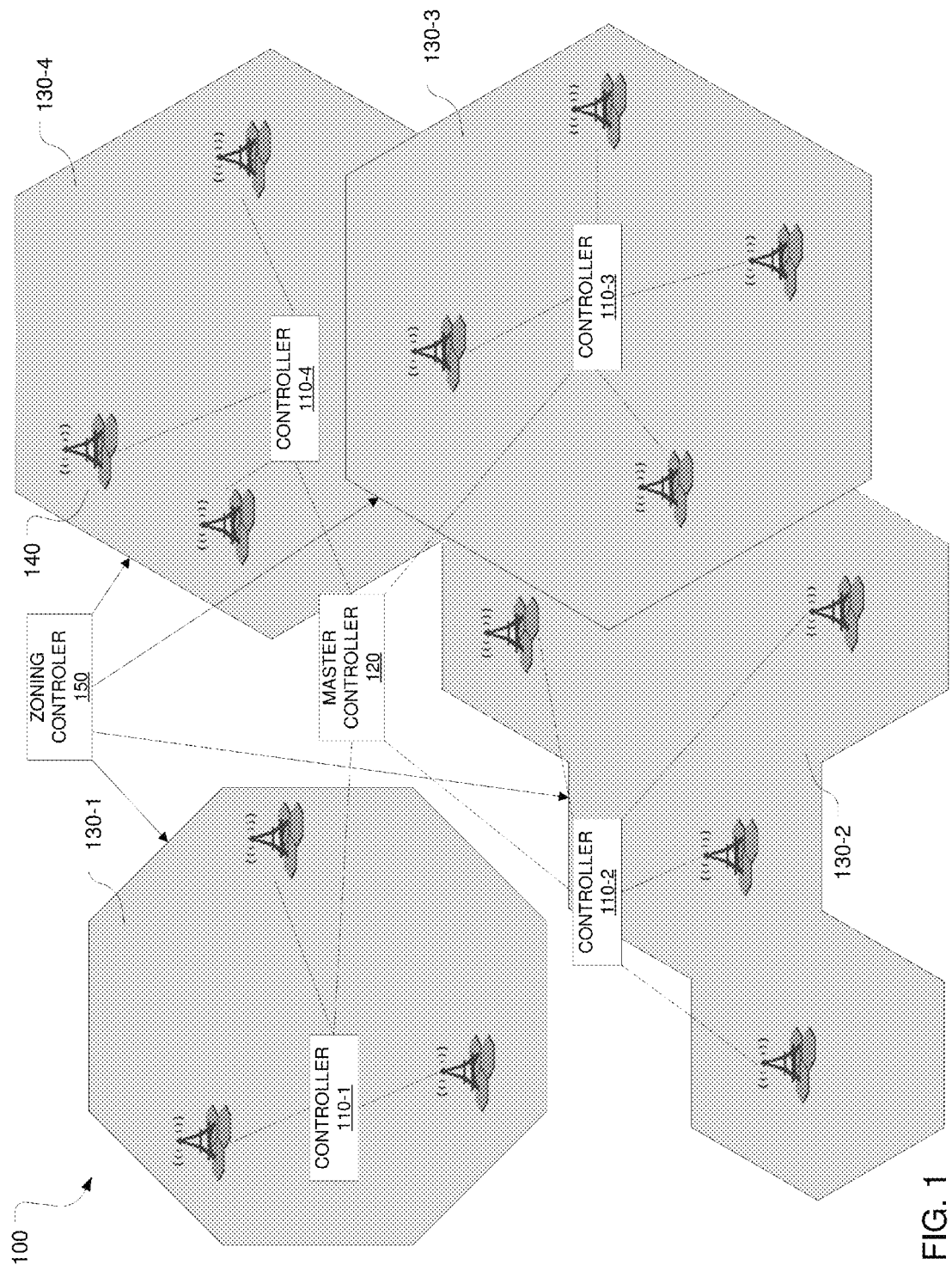
FIG. 1 is a diagram of one embodiment of a zoned network.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

Future wireless networks are expected to satisfy demands for higher throughput, lower latencies, lower energy, lower costs, and more numerous connections. Technologies such as network function virtualization (NFV) and software defined networking (SDN) have become increasingly important in building future wireless networks. NFV enables network functions that are traditionally tied to dedicated hardware to run on a cloud computing infrastructure in a data center. The separation of the data plane, the control plane, and the management plane network functions from dedicated hardware infrastructure is likely to become a common feature of future wireless network architectures. One benefit is the ability to elastically support network functional demands. SDN is an architectural framework for creating intelligent programmable networks, where the control planes and the data planes are decoupled, network intelligence and state are logically centralized, and the underlying network infrastructure is abstracted from the application.

The traffic engineering (TE) problem is to determine routing paths for the various traffic flows and to allocate resources, e.g., bandwidth, along the paths according to respective quality of service (QoS) requirements such that network utility is maximized. TE is a complex problem that grows more complex as the network gets larger. A feature of SDN is that wireless networks can be dynamically divided into zones to improve performance. More specifically, it is realized herein, dividing a wireless network into zones, i.e., zoning the network, allows for distributed optimization of the TE problem where centralized control becomes impractical or infeasible due to the size or loading of the network. A zone includes its zone controller, i.e., SDN controller, and its associated network elements, which include its nodes and links. It is further realized herein the wireless network can be divided into geographic zones or logical zones. Geographic zones are formed according to regional considerations, such as locations of user equipments (UEs), radio nodes, and routers, and densities of the same, among other factors. For example, a zone could be defined with a single SDN controller that serves all network elements within 10 miles. Alternatively, logical network zones are formed according to network traffic flows. For example, network elements associated with a particular traffic flow could be allocated to a single logical zone and a single SDN controller. Geographic zoning is amenable to TE optimization formulated using an arc-flow model. Logical zoning is amenable to TE optimization formulated using a path-flow model. It is further realized herein that local zone controllers can be further controlled and coordinated by a master zone controller, or master controller. The wireless network can be periodically re-zoned, by a zoning controller, and re-optimized, by the master zone controller, as traffic fluctuates and users migrate from one zone to another.

Optimization of the zoning problem is a balance of grouping network elements into zones and minimizing overhead of distributed, zone-based TE optimization. With distributed optimization of the TE problem, the TE problem can be decomposed into sub-problems tasked to local zone controllers, i.e., SDN controllers, for the various zones. An SDN controller, residing in the control plane, collects status information and traffic requirements from network elements to formulate the TE problem. The SDN controller provides control decisions to the data plane hardware to direct operation of the network.

Control plane overhead has several sources. These sources include TE problem initialization, network status reporting, network provisioning commands, and interaction among SDN controllers. TE problem initialization overhead is due to the master controller distributing traffic flow information, such as source, destination, demand, etc., to selected zone controllers. Network status corresponds to the status of the links incident to a node and the status of a node. Links connecting nodes within a zone are internal links and links connecting nodes of different zones are border links. Distribution of the SDN controllers to different zones can confine network status reporting and network provisioning to a given zone, but can introduce overhead cost in coordinating the various zones. A non-optimally small number of zones increases the network status reporting and network provisioning loads on the individual SDN controllers while reducing coordination overhead; and a non-optimally large number of zones increases coordination overhead while reducing the individual SDN controllers' network status reporting and network provisioning loads. Thus, determining the number of zones is a balancing task within the zoning optimization. The determination of the number of zones is made by the zoning controller according to expected zone TE complexity, which is generally expressed in time, the network size, and the traffic load. A component of expected zone TE complexity is the processing capacity of a particular SDN controller. Another component of expected zone TE complexity is how quickly TE optimization should be carried out. A solution to the TE problem is arrived at within a period of time determined, at least partially, by the traffic load and throughput. If the TE problem cannot be solved quickly enough then congestion will be caused by nodes not knowing how to route traffic. Accordingly, if a particular SDN controller has insufficient processing capacity to solve its expected TE sub-problem, the number of zones should be increased, thereby further distributing the processing load. The relationship of TE complexity, network size, and traffic load can be observed empirically, through various system measurements and data points. These measurements and data points can be centralized in a management information base (MIB), for example. Once the required number of zones is known, the network can be divided, or partitioned, into zones. Zones, which are sometimes referred to as pieces or partitions, may overlap in certain embodiments, and not overlap in other embodiments. The partitioning is carried out according to a solution for a partitioning problem, or zoning problem. The solution to the partitioning problem can be found using several approaches, some of which are used for geographical zones, and others used for logical zones.

A wireless network can include many SDN controllers. In fact, any network element can implement an SDN controller. In zoning the wireless network, zone controllers are selected from the available SDN controllers in the network, potentially leaving some SDN controllers unselected. For example, an SDN controller unassociated with any other network elements or traffic flows, may not be selected. Likewise, some network elements may not be associated with any SDN controller. The number of SDN controllers to select as zone controllers can depend on the number of zones. For example, a network can be configured to assign one SDN controller per zone. The number of zones is generally no larger than the number of available SDN controllers.

Zone controllers are selected with a goal of maximizing the minimum inter-controller distance, which is generally expressed in a hop count. In alternative embodiments, other measurements of distance can be used, including Euclidean distance, communication delay, and others that will be apparent to those skilled in the art. Zone controllers are also selected to obtain a uniform distribution of controllers, which facilitates controller load balancing. Inter-controller distance can be affected by the density of nodes in a given region. Having many SDN controllers in a dense area, although advantageous, tends to have low inter-controller distance, which has a countervailing effect with respect to the goal of maximizing minimum inter-controller distance. To balance this tendency, inter-controller distances for SDN controllers can be weighted according to how central or remote a particular SDN controller is with respect to a given distribution of nodes. When the number of SDN controllers is small, the selection can be done by exhaustive search, essentially evaluating every possible combination of SDN controllers. Otherwise, selection can be done heuristically. Once SDN controllers are selected, each SDN controller is dispatched to a zone, effectively tasking it to solve its TE sub-problem. Dispatching SDN controllers is carried out to a solution to a dispatching problem.

For a network of N nodes, all of which forward data plane packets over links connecting them to other nodes. A subset, S, of the nodes are configured to serve as controllers. The zoning process creates |S| zones by coupling subsets of data plane nodes to the controller nodes. Each data plane node is associated with a unique controller, which collects its network status and provisions its forwarding tables. Network status corresponds to the status of the links incident to a node. Controllers interact with each other in the control plane and participate in distributed network optimization (DNO). Controllers work together to solve a DNO problem, which can be decomposed into multiple sub-problems corresponding to each zone and a coordinating master problem. Distributed optimization can be solved iteratively. In each iteration, the zone sub-problems are solved to obtain resource allocations for the zones according to collected network status information for the zone and the overhead costs of using border links. Resource allocations for border links can be coordinated by a master SDN controller that solves the master TE problem.

The partitioning problem is formulated for geographic zoning, where the TE problem initialization overhead is ignored, as follows:

$$\min \Sigma_{s \in S}(d_s^{coll} + d_s^{coor} + d_s^{prov})$$

such that, $$d_s^{coll} = \Sigma_{i \in N} \alpha_{is} h_{is} (\alpha + \beta \Sigma_{j:j \neq i, j \in N} l_{ij}),$$

$$d_s^{coor} = \eta \gamma \Sigma_{i \in N} \Sigma_{j:j \neq i, j \in N} 2(h_{is} + h_{sm}) l_{ij} (\alpha_{is} + \alpha_{js} - 2\alpha_{is}\alpha_{js}), \forall s \in S$$

$$d_s^{prov} = \Sigma_{i \in N} \alpha_{is} h_{si} (\mu + \nu \Sigma_{j:j \neq i, j \in N} l_{ij}), \forall s \in S$$

$$-\tau \leq \Sigma_{i \in N}(\alpha_{is} - \alpha_{is'})(1 + \Sigma_{j:j \neq i, j \in N} l_{ij}) \leq \tau, \forall s, s' \in S$$

$$\alpha_{is} \in \{0,1\}, \forall i \in N, \forall s \in S$$

$$\Sigma_{s \in S} \alpha_{is} = 1, \forall i \in N$$

Where,
N is the set of nodes in the network,
S is the set of controllers, $S \subseteq N$,
m is the master controller, $m \in S$,
$\alpha$ is the number of data units per node report,
$\beta$ is the number of data units per link report,
$\gamma$ is the number of auxiliary data units per link,
$\eta$ is the number of distributed network optimization iterations,
$\mu$ is the number of data units per node provisioning,
$\nu$ is the number of data units per link provisioning,
$\tau$ is the zone imbalance tolerating factor,
$l_{ij}$ is the connectivity indicator of i and j, $\forall i, j \in N$, and
$h_{ij}$ is the hop distance from i to j, $\forall i, j \in N$.

The first condition of the formulation defines a per-zone collection overhead, $d_s^{coll}$. Each node reports information about itself and its incidental links to its controller. The reporting takes place in individual zones and the total bits transmitted is counted as collection overhead. The second condition describes per-zone coordination overhead, $d_s^{coor}$, which includes total bits that each slave controller reports to and receives from the master controller. Each of these applies for the number of shared links of individual zones and the number of coordination iterations. The third condition defines per-zone provisioning overhead, $d_s^{prov}$, which is counted similarly to per-zone collection overhead. Provisioning is carried out for nodes and links. Each link is provisioned twice: once for each end node. The fourth condition is a zone balancing constraint, where T is selected to guarantee problem feasibility. The fifth condition constrains the decisions on node-controller association to be binary. The last constraint indicates each node is associated to a single controller. $\alpha_{is}$ are decision variables that indicate whether i is associated with s.

As formulated above, there are several heuristic approaches to solving the partitioning, i.e., zoning, problem for geographic zones, including clustering, partitioning, and task-assignment. Clustering associates each node to a closest controller based on hop distance or a given distance measure. Partitioning partitions the network into S connected components and then assigns controllers. Task-assignment applies a MinMin philosophy. These heuristic approaches use physical topology information to form the geographic zones. Physical topology information includes control plane topology and data plane topology. Control plane topology information includes information about SDN controllers, routers, and UEs, connections between SDN controllers, connections between each network component/SDN controller pair, connections between each UE/SDN controller pair, and parameters associated with nodes and connections. The parameters can include connection cost, node capability, and others. Connections can be real or virtual. Data plane topology information includes information about routers and UEs, physical links, which include wire-line and wireless, and parameters associated with nodes and links. These parameters can include computational load introduced to the TE problem.

With clustering, each controller initially forms a zone that increases in size by incrementally absorbing external nodes that have a direct link to one of its internal nodes. When a node can be absorbed by multiple zones, it is absorbed by that which is closest in hop distance. When multiple zones have the same hop distance between the node and the controller, the decision can be made randomly. The controller is generally geographically contained within the zone in this approach.

With partitioning, the network can be modeled as a network graph that is partitioned into k connected components of balanced size using a cut with a minimum sum link weight. This is sometimes referred to as a balanced minimum k-cut problem. The partitioning heuristic is based on finding a balanced minimum k-cut of the network graph, where k=|S|. This is carried out in two steps. The first is to solve the balanced minimum k-cut problem over a naturally weighted network graph, where each node i is weighted by $\alpha + \beta \Sigma_{j \in N} l_{ij}$ and all links have equal weight $\gamma$. The solution is found by engaging a known heuristic, such as multi-level partitioning. Controllers are then dispatched to each partition with the goal of minimizing total communication cost between nodes and controllers and between the master and slave controllers.

The dispatching problem is modeled as a task assignment problem. Let $\Pi$ represent the set of partitions obtained at the first step of the partitioning solution. $\Pi$ contains a matching number of partitions to controllers, i.e., $|\Pi|=|S|$. Let B(P) be the border of partition $P \in \Pi$, which is composed of the set of edges that that have one end in P and the other end in P', $P' \neq P$. For each edge $e \in P$, denoted by $e^P$, the end vertex residing in P. The controller dispatching problem is formulate as follows:

$$\min \sum_{s \in S} \sum_{p \in \Pi} c_{s,P}(d_{s,P}^{coll} + d_{s,P}^{coor} + d_{s,P}^{prov})$$

such that, $$d_{s,P}^{coll} = \sum_{i \in P} h_{is}\left(\alpha + \beta \sum_{j:j \neq i, j \in N} l_{ij}\right), \forall s \in S, P \in \Pi$$

$$d_{s,P}^{coor} = \sum_{e \in B(P)} 2\eta\gamma(h_e P_s + h_{sm}), \forall s \in S, P \in \Pi$$

$$d_{s,P}^{prov} = \sum_{i \in P} h_{si}\left(\mu + \nu \sum_{j:j \neq i, j \in N} l_{ij}\right), \forall s \in S, P \in \Pi$$

$$c_{s,P} \in \{0, 1\}, \forall s \in S, P \in \Pi$$

$$\sum_{s \in S} c_{s,P} = 1, \forall P \in \Pi$$

$$\sum_{P \in \Pi} c_{s,P} \leq 1, \forall s \in S$$

Where $c_{s,P}$ are decision variables that indicate whether controller s is dispatched to partition P. The first three conditions define the collection overhead, the coordination overhead, and the provisioning overhead induced by dispatching respective controllers to partitions. The fourth constraint requires the decision to be binary. The fifth constraint forces partitions to be dispatched exactly one controller. The sixth constraint requires that each controller cannot be dispatched to more than one partition. The sixth constraint allows more controllers than partitions, providing flexibility. Controllers are not necessarily contained within their assigned geographic zone.

With task-assignment, the zoning problem is structured such that each node is a task assigned to a unique controller to minimize total cost. The cost, C(Z), of a zoning configuration Z is described by the following:

$$C(Z) = \sum_{s \in S} (\omega(d_s^{coll}(Z) + d_s^{coor}(Z) + d_s^{prov}(Z)) + (1-\omega)p(Z))$$

Where $d_s^{coll}(Z)$, $d_s^{coor}(z)$ and $d_s^{prov}(Z)$ are intra-zone information collection costs, master-slave coordination costs, and provisioning cost. The costs are computed according to the original problem formulation above. p is a zone-imbalance cost computed with respect to the fourth zone size balancing constraint of the original problem, and ω is a weighting factor.

According to the assignment heuristic, $Z_s$ is a zone assigned controller s, where s∈S. In an initial zoning configuration, $Z^0$, each controller is assigned to a zone containing itself as its only member. All non-controller nodes belong to an unassociated node set, U. A frontier of U, $F_s$, is defined with respect to zone $Z_s$, and repeated for all zones. Frontier $F_s$ includes a set of nodes in U that have a link to a node in $Z_s$. Upon each iteration, a frontier node, i, is moved from U to a bordering zone, $Z_s$. The move is achieved in two steps. In the first, for each node i in each frontier $F_s$, a cost increase, Δ(i,s), is computed for each bordering zone $Z_s$ with the addition of frontier node i. The cost of the new zoning configuration $Z^t(i,s)$ is computed with respect to its previous zoning configuration $Z^t$ according to the equation Δ(i,s)=C($Z^t$(i,s))−C($Z^t$). In the second step, the frontier node for which there is a minimum cost increase is identified and that node is moved. When the set U is empty, the procedure stops.

A logical zone is a union of candidate routing paths of member flows. Multiple logical zones may overlap physically due to link sharing among flow paths. As formulated above, there are several approaches to solving the zoning problem for logical zones, including a task assignment heuristic and a graph partition heuristic. The heuristic algorithms use data flow information to form the logical zones. Data flow information includes per-flow routing path candidates and parameters associated with each flow. The parameters can include computational load introduced to the TE problem, associated virtual networks, and others. The graph partition approach uses a flow graph that models link sharing among flows and solves the problem using graph theory. For logical zones, the network is modeled as having a node set N and a link set L. A subset of nodes, S, are configured as controllers, one of which is a master controller, m. A set of traffic flows, F, are given for the TE problem. It is assumed that routing paths for individual flows are known. The zoning process creates k zones by coupling subsets of flows to the controller nodes. Each flow is associated to a unique controller that collects the network status of the nodes and links along its routing paths. The controller informs flow sources of their TE decisions. A logical zone's size is defined as a total number of candidate paths of the flows in the zone. Logical zones are formed with goals of minimizing overhead cost and balancing zone size.

A zoning configuration, Z, for logical zoning, is described by a flow-controller association matrix, $Z=[\alpha_{fs}]_{|F| \times |S|}$, where each column vector, $Z_s$, defines a zone controlled by a slave SDN controller, s. For a flow f∈F and a slave controller s∈S, $\alpha_{fs}$=1 if f is associated to s, and 0 otherwise. By definition, a size $|Z_s|$ of zone $Z_s$ is computed as $|Z_s|=\Sigma_{f \in F}\alpha_{fs}|f|$, where |f| is the size of flow f, which is the number of candidate paths for flow f.

Given zone configuration Z, the overhead cost, C(Z), includes an initialization cost, $C^{init}(Z)$, a collection cost, $C^{coll}(Z)$, a provisioning cost, $C^{prov}(Z)$, and a coordination cost, $C^{coor}(Z)$ such that: $C(Z)=C_{init}(Z)+C^{coll}(Z)+C^{prov}(Z)+C^{coor}(Z)$. Coordination cost occurs across optimization iterations while the other three costs are incurred once at the beginning or end of the optimization.

Initialization cost is due to the master controller distributing flow information, including flow source, destination, demand, etc., to slave controllers. The information distributed to a given slave controller is limited to that of flows associated to the slave controller. Initialization cost is given by $C^{init}(Z_s)=\mu\Sigma_{f \in F}\alpha_{fs}h_{ms}$, where μ is a number of data units per flow description, and $h_{ms}$ is the overhead cost per data unit for communication from the master controller to a slave controller.

Collection cost is due to each slave controller gathering node and link state in its zone. Collection cost is given by $C^{coll}(Z)=\alpha\Sigma_{i \in N}u_i^s h_{is}+\beta\Sigma_{l \in L}v_l^s h_{l_{min}^s s}$, where $u_i^s=\max_{f \in F}(\delta_i^f \alpha_{fs})$ and $v_l^s=\max_{f \in F}(\delta_l^f \alpha_{fs})$ respectively indicate whether a node i or a link l is associated to a slave controller s, α is a number of data units per node state report, β is a number of data units per link state report, $h_{is}$ is overhead cost per data unit for communication from a node to the slave controller, and $h_{l_{min}^s s}$ is overhead cost per data unit for a link between an end node and the slave controller.

Provisioning cost is due to slave controllers distributing TE decisions throughout their zones. Provisioning cost is given by $C^{prov}(Z)=v\Sigma_{f \in F}\alpha_{fs}h_{sf_{src}}$, where v is a number of data units in a TE decision per flow path and $h_{sf_{src}}$ is overhead cost per data unit for communication from the slave controller to a source node of a flow.

Coordination cost is due to the master controller's collecting and updating the states of the TE sub-problems for the slave controllers. The amount of data exchanged is proportional to the number of links shared by the zones. Coordination cost is given by $C^{coor}(Z) = \eta\gamma(h_{sm}+h_{ms})\Sigma_{f,g\in F:g\neq f} n_{fg} b_{fg}^{s}$, where $b_{fg}^{s} = \alpha_{fs}+\alpha_{gs}-2\alpha_{fs}\alpha_{gs}$ indicates whether one and only one off and g belongs to zone $Z_s$, $\eta$ is a number of TE optimization iterations, $\gamma$ is a number of data units per shared link between zones, $h_{sm}$ and $h_{ms}$ are overhead costs for communication between the slave controller and the master controller, and $n_{fg}$ is a number of links shared in f and g, where f, g∈F.

As described above, the partitioning problem is an exercise in minimizing overhead cost, C(Z), such that $|Z_s|-|Z_{s'}|\leq \epsilon, \forall s,s'\in S:s\neq s'$, $\alpha_{fs}\in\{0,1\}, \forall f\in F, \forall s\in S$, $\Sigma_{s\in S}\alpha_{fs}=1, \forall f\in F$, where $\epsilon$ is a load imbalance tolerating factor.

For solving the partitioning problem using the task assignment approach for logical zones, given an imbalance cost factor (ICF) ω, the zoning problem is relaxed by removing the size balancing constraint and adding a penalization term, p(Z). The new cost equation and penalization term are given by:

$$C'(Z) = (1-\omega)C(Z) + \omega p(Z)$$
$$p(Z) = \max_{s,s'\in S:s\neq s'}(|Z_s|-|Z_{s'}|)$$

Accordingly, the zoning problem becomes:

$$\min_{Z} C'(Z)$$

such that $\alpha_{fs}\in\{0,1\}, \forall f\in F, \forall s\in S$, and $\Sigma_{s\in S}\alpha_{fs}=1, \forall f\in F$. Using a task assignment approach, each flow, i.e., task, is assigned a unique controller, i.e., processor, to minimize the objective function value. An algorithm, such as the MinMin heuristic and others, iterates and incrementally builds a zone configuration, Z.

In the task assignment approach, a set of flows for which no assignment decisions are made is represented by U. Initially, the zone configuration, Z, is an empty set and U=F. In each iteration, an assignment decision is made for one flow, assigning that flow, f, to a slave controller, s. This is represented by setting $\alpha_{fs}=1$. The flow is then removed from U.

In the graph partition heuristic approach, flows are aggregated according to their source and destination, such that flows originating from the same source and destined to the same destination are considered a single flow. A flow graph is then constructed by representing each flow as a vertex and connecting a subset of vertices with an edge for each distinct network link shared by the vertices. Each vertex is given a weight, t×|f|, where t is a number of original flows, i.e., before aggregation, the vertex represents and |f| is flow size. Edges are also given a weight according to the number of distinct flow paths passing through. The resulting flow graph is a hypergraph, where each edge implies link sharing and corresponds to a unique network link. The flow graph is partitioned into k connected components for k=|S|, each component defines a logical zone and is dispatched a unique controller.

FIG. 1 is a diagram of one embodiment of a zoned network 100. Zoned network 100 includes four controllers 110-1 through 110-4, a master controller 120, a zoning controller 150, and multiple network nodes 140. Multiple network nodes 140 are variously distributed throughout zoned network 100. Network nodes are sometimes referred to as access points, Node Bs, or evolved Node Bs (eNBs). Controllers 110-1 through 110-4 and master controller 120 are also network nodes with additional capability and configuration to serve as controllers. Generally, any network node can embody a controller. Controllers 110-1 through 110-4 are sometimes referred to as SDN controllers, zone controllers, or slave controllers. Master controller 120 is also sometimes referred to as an SDN controller.

Zoning controller 150 partitions zoned network 100 into four zones 130-1 through 130-4. Each of the four zones are assigned one of controllers 110-1 through 110-4. Zone 130-1 is assigned controller 110-1, which serves the three network nodes within. Zone 130-2 is assigned controller 110-2, which serves the four network nodes within. Zone 130-3 is assigned controller 110-3, which serves the four network nodes within. Zone 130-4 is assigned controller 110-4, which serves the three network nodes within. Master controller 120 coordinates TE optimization among controllers 110-1 through 110-4. Master controller 120 and zoning controller 150 are separate logical network elements. Master controller 120 and zoning controller 150 can be embodied in a single computing system, or in separate computing systems.

Figure 2:
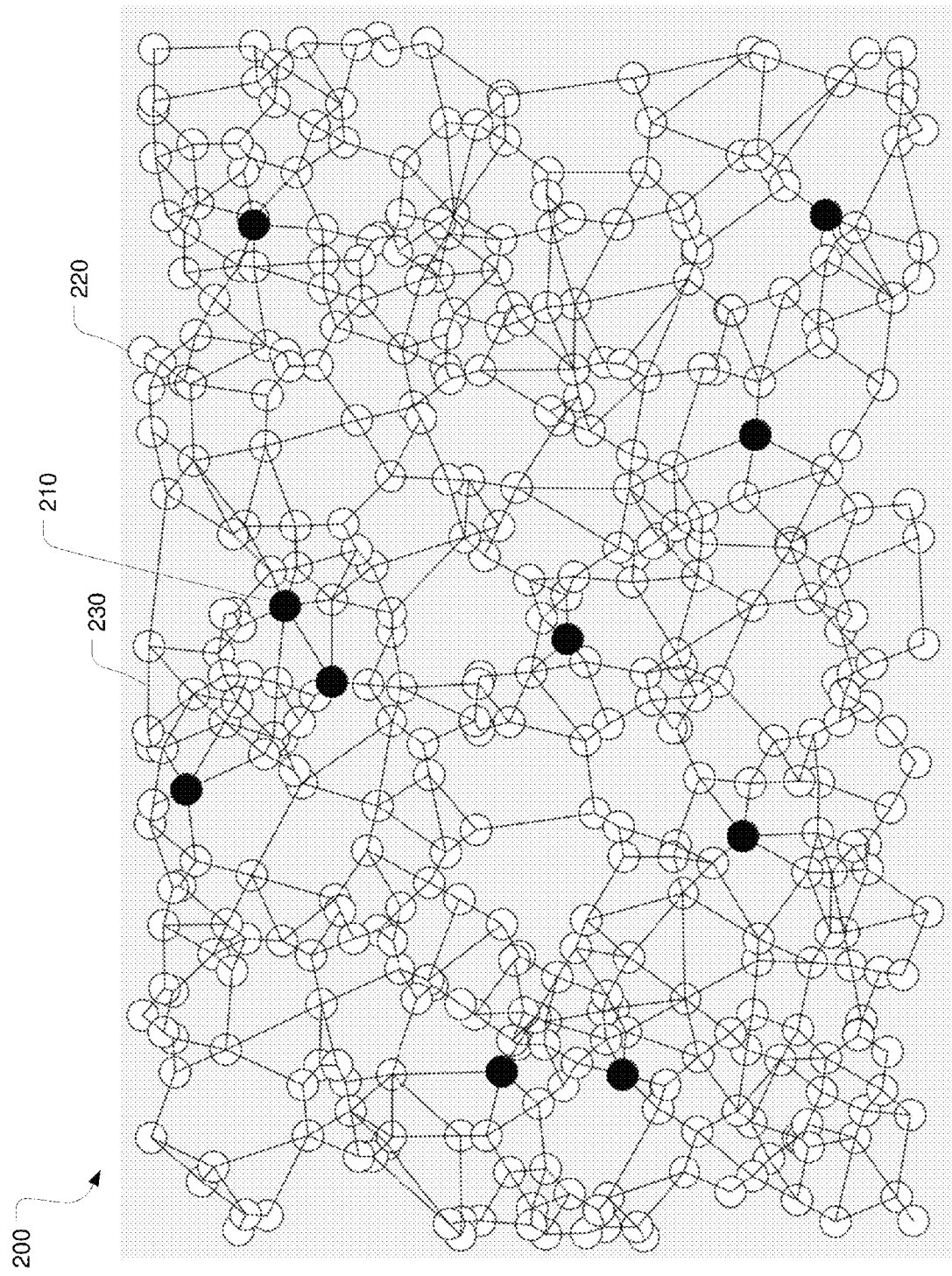
FIG. 2 is one embodiment of a topology graph.

FIG. 2 is one embodiment of a topology graph 200. Topology graph 200 includes 400 network nodes 220, ten of which are controllers 210. Network nodes 220 are represented by white circles in topology graph 200, while controllers 210 are represented by black circles. Any of controllers 210 can also be designated as a master controller. Network nodes 220 are connected by edges 230 representing links, or hops.

Figure 3:
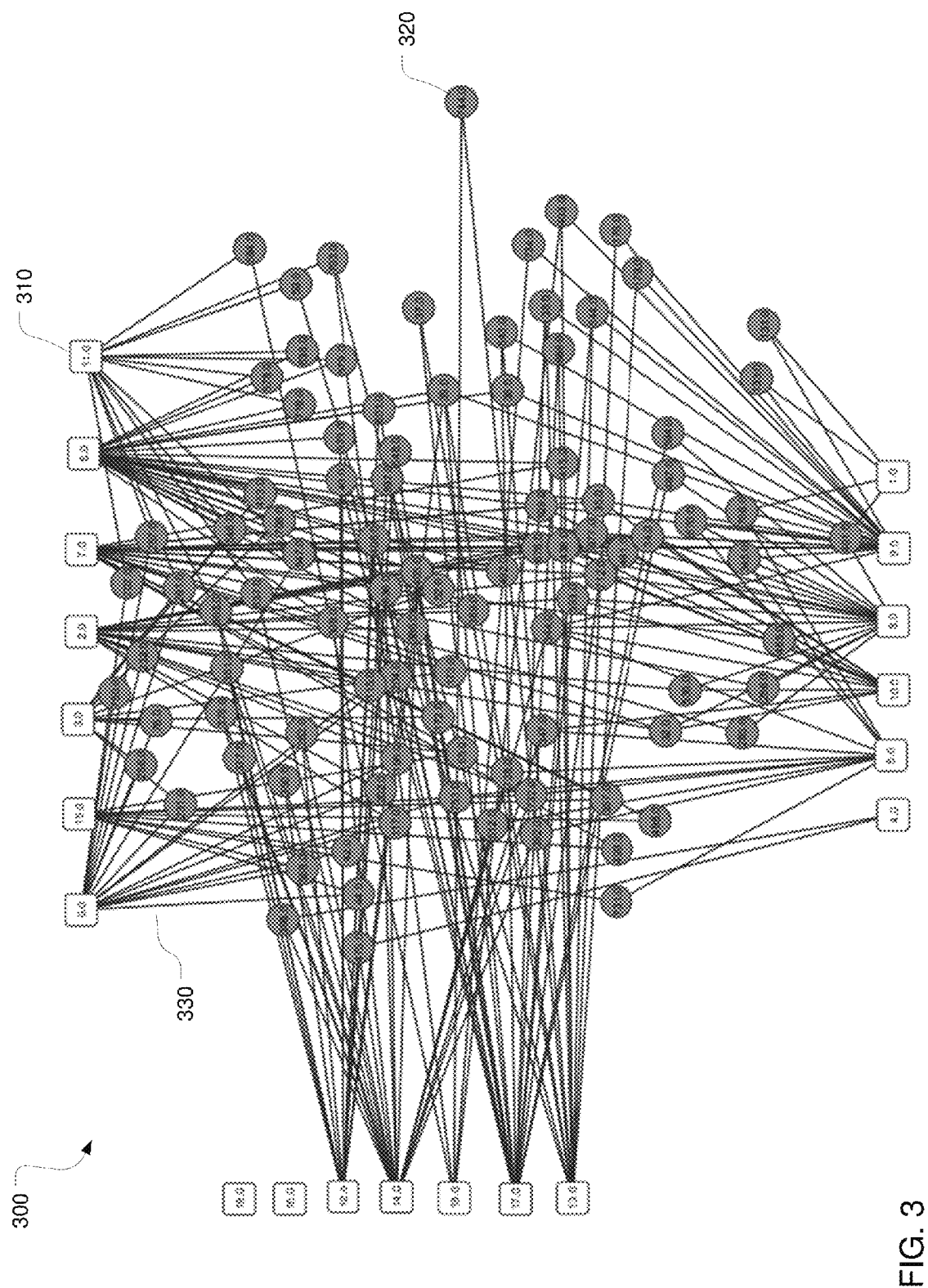
FIG. 3 is one embodiment of a flow graph.

FIG. 3 is one embodiment of a flow graph 300. Flow graph 300 includes traffic flows 310, represented by white boxes, hyper-edges 320, represented by gray circles, and lines 330. Traffic flows 310 have respective weights. A traffic flow's weight is computed as the product of its flow size and its number of flows. Flow size refers to the number of candidate paths for the flow. The number of flows refers to the number of flows without aggregation, which is to treat flows between a common source and common destination as one aggregate flow. For example, in flow graph 300, the lower row of flows have weights of 4.0, 5.0, 10.0, 8.0, 9.0, and 1.0, from left to right. Hyper-edges 320, sometimes referred to simply as edges, represent physical links. Lines 330 variously connect traffic flows 310 to hyper-edges 320, indicating that certain traffic flows share physical links. Hyper-edges 320 are also assigned respective weights indicating a number of flow paths passing through.

Figure 4:
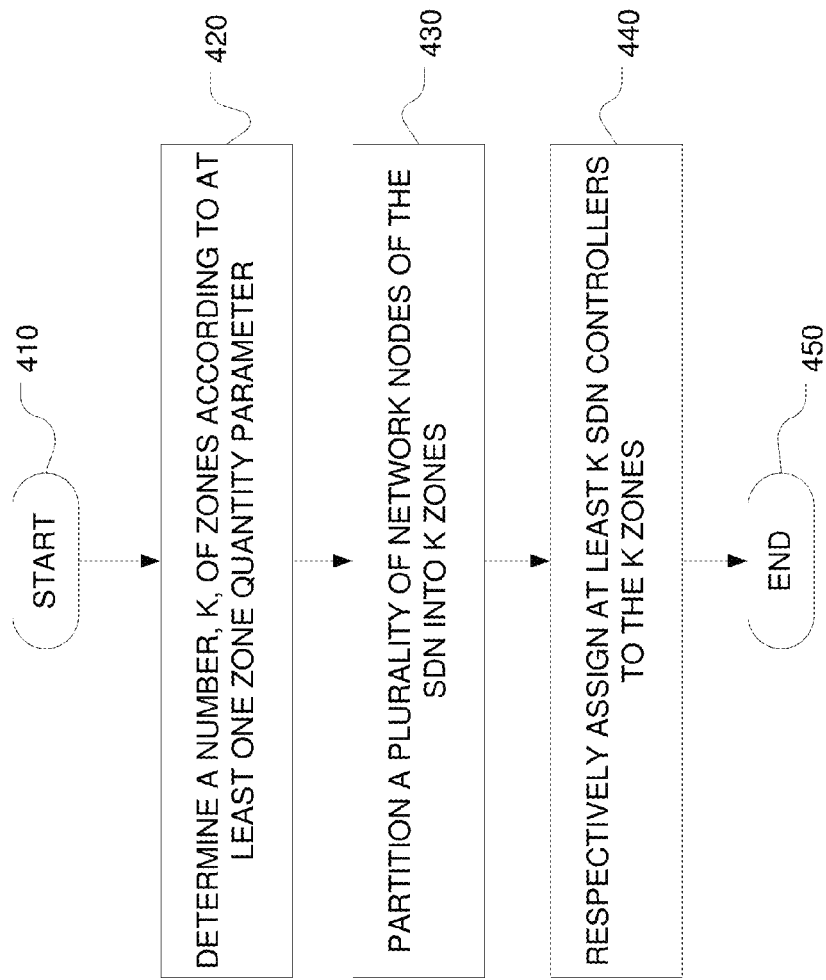
FIG. 4 is a flow diagram of one embodiment of a method of zoning an SDN.

FIG. 4 is a flow diagram of one embodiment of a method of zoning an SDN. The SDN contains a plurality of network nodes and a plurality of SDN controllers. The method begins at a start step 410. At a zone quantity step 420, a determination is made as to how many zones the network should be partitioned into. This quantity, K, is determined according to at least one zone quantity parameter. Zone quantity parameters include an expected zone TE complexity, network size, traffic load, and flow information. More specifically, the determination considers the relationship between TE complexity and the network size, traffic load, and flow information. TE complexity is a function of controller processing capability and the operational requirements regarding how quickly TE optimization should be carried out.

In certain embodiments, the method also includes a selecting step where at least K zone controllers are selected from available SDN controllers. Zone controllers are selected such that minimum inter-controller distance is maximized. Inter-controller distance is generally expressed as a hop count. Selecting zone controllers aims to achieve a uniform distribution of zone controllers. The uniform distribution facilitates load balancing. Additionally, in certain embodiments, inter-controller distance is weighted to properly balance zones when there is large variance in network node density. When the number of controllers, K, is small, selection can be carried out exhaustively, effectively evaluating all possible combinations. Otherwise, heuristic methods can be used to select the K controllers.

Continuing the embodiment of FIG. 4, at a zoning step 430, the plurality of network nodes are partitioned into K zones. In some embodiments, the K zones are geographic zones. In other embodiments, the K zones are logical zones. The aim of the partitioning is to minimize overhead cost in the TE optimization process. Overhead cost in TE optimization includes communication costs in collecting node and link statuses, communication costs in provisioning, and communication costs in coordinating among the controllers. The partitioning is carried out according to a heuristic method. Several heuristic approaches can be used, including clustering, partitioning, and task assignment approaches for geographic zones, and task assignment and graph partitioning for logical zones. The controllers are assigned to respective zones at a dispatching step 440. The method ends at an end step 450.

Figure 5:
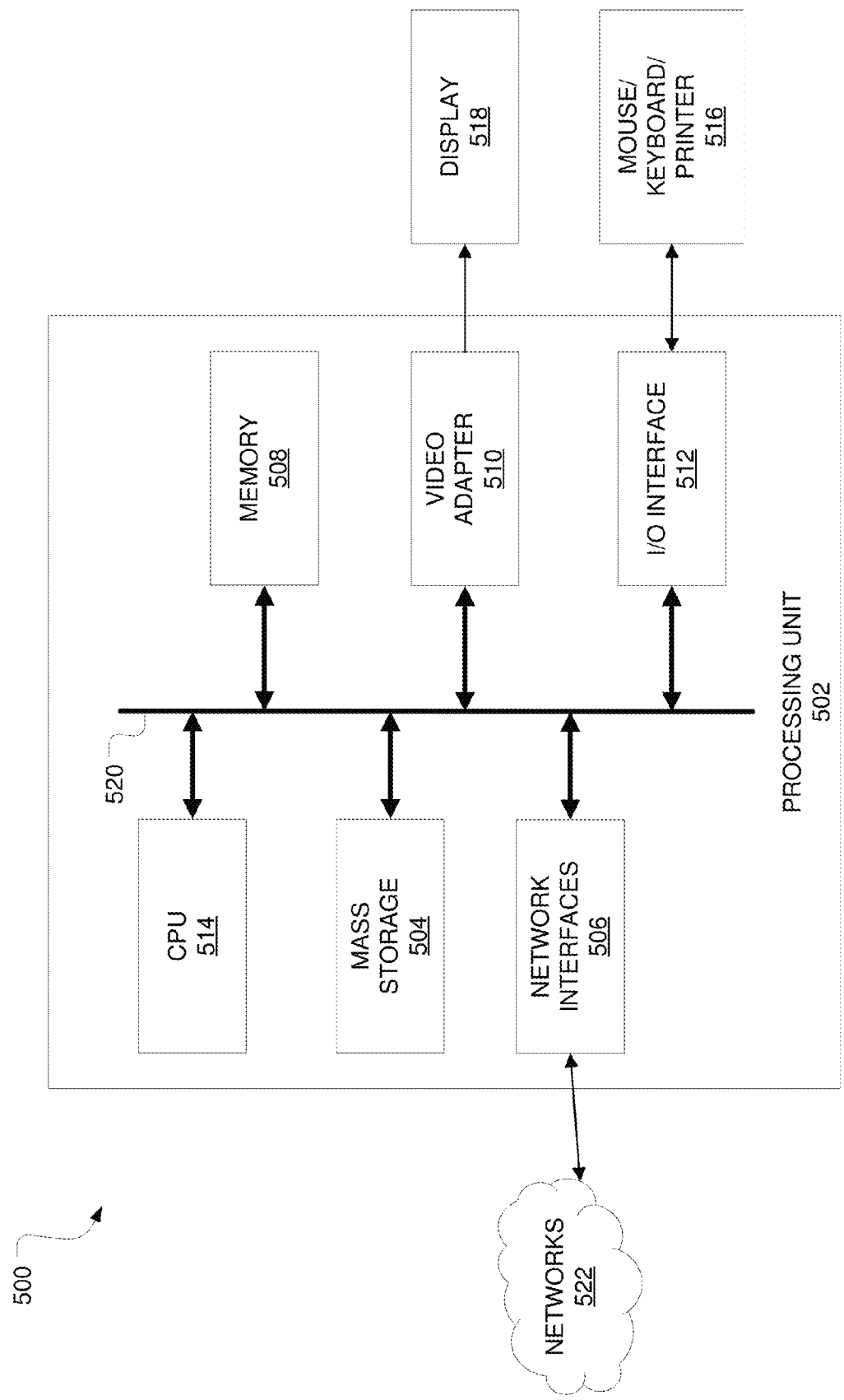
FIG. 5 is a block diagram of one embodiment of a computing system.

FIG. 5 is a block diagram of a computing system 500 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 500 may comprise a processing unit 502 equipped with one or more input/output devices, such as a speaker, microphone, mouse, touchscreen, keypad, keyboard, printer, display, and the like. The processing unit may include a central processing unit (CPU) 514, memory 508, a mass storage device 504, a video adapter 510, and an I/O interface 512 connected to a bus 520.

The bus 520 may be one or more of any type of several bus architectures including a memory bus or memory controller, a peripheral bus, video bus, or the like. The CPU 514 may comprise any type of electronic data processor. The memory 508 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 508 may include ROM for use at boot-up, and DRAM for program and data storage for use while executing programs.

The mass storage 504 may comprise any type of non-transitory storage device configured to store data, programs, and other information and to make the data, programs, and other information accessible via the bus 520. The mass storage 504 may comprise, for example, one or more of a solid state drive, hard disk drive, a magnetic disk drive, an optical disk drive, or the like.

The video adapter 510 and the I/O interface 512 provide interfaces to couple external input and output devices to the processing unit 502. As illustrated, examples of input and output devices include a display 518 coupled to the video adapter 510 and a mouse/keyboard/printer 516 coupled to the I/O interface 512. Other devices may be coupled to the processing unit 502, and additional or fewer interface cards may be utilized. For example, a serial interface such as Universal Serial Bus (USB) (not shown) may be used to provide an interface for a printer.

The processing unit 502 also includes one or more network interfaces 506, which may comprise wired links, such as an Ethernet cable or the like, and/or wireless links to access nodes or different networks. The network interfaces 506 allow the processing unit 502 to communicate with remote units via the networks. For example, the network interfaces 506 may provide wireless communication via one or more transmitters/transmit antennas and one or more receivers/receive antennas. In an embodiment, the processing unit 502 is coupled to a local-area network 522 or a wide-area network for data processing and communications with remote devices, such as other processing units, the Internet, remote storage facilities, or the like.

Figure 6:
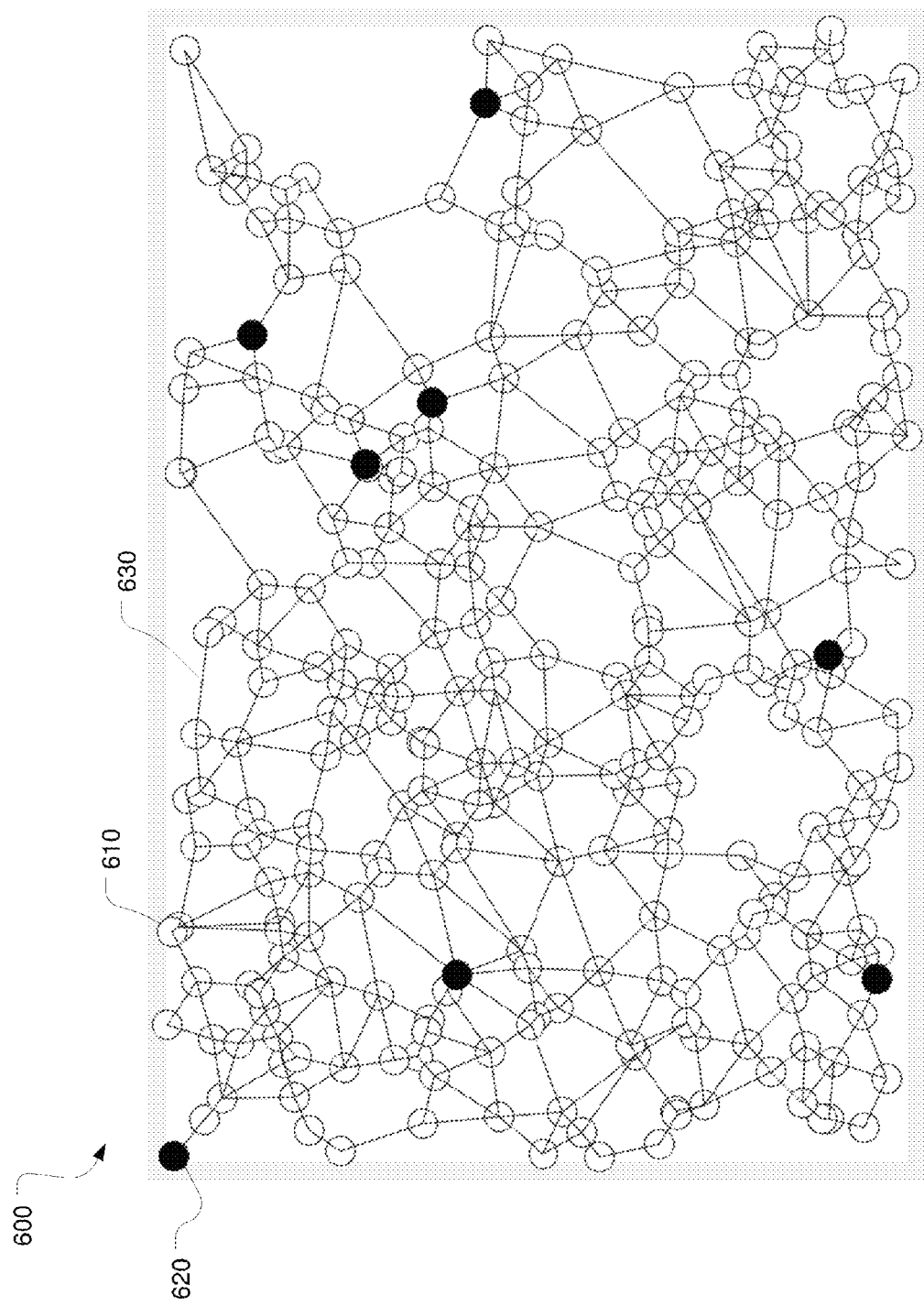
FIG. 6 is another embodiment of a topology graph.

FIG. 6 is another embodiment of a topology graph 600. Topology graph 600 includes network nodes 610, eight of which are designated as controllers 620. As in FIG. 2, network nodes 610 are represented by white circles and controllers 620 are represented by black circles. Lines 630 represent links among the various network nodes.

Figure 7:
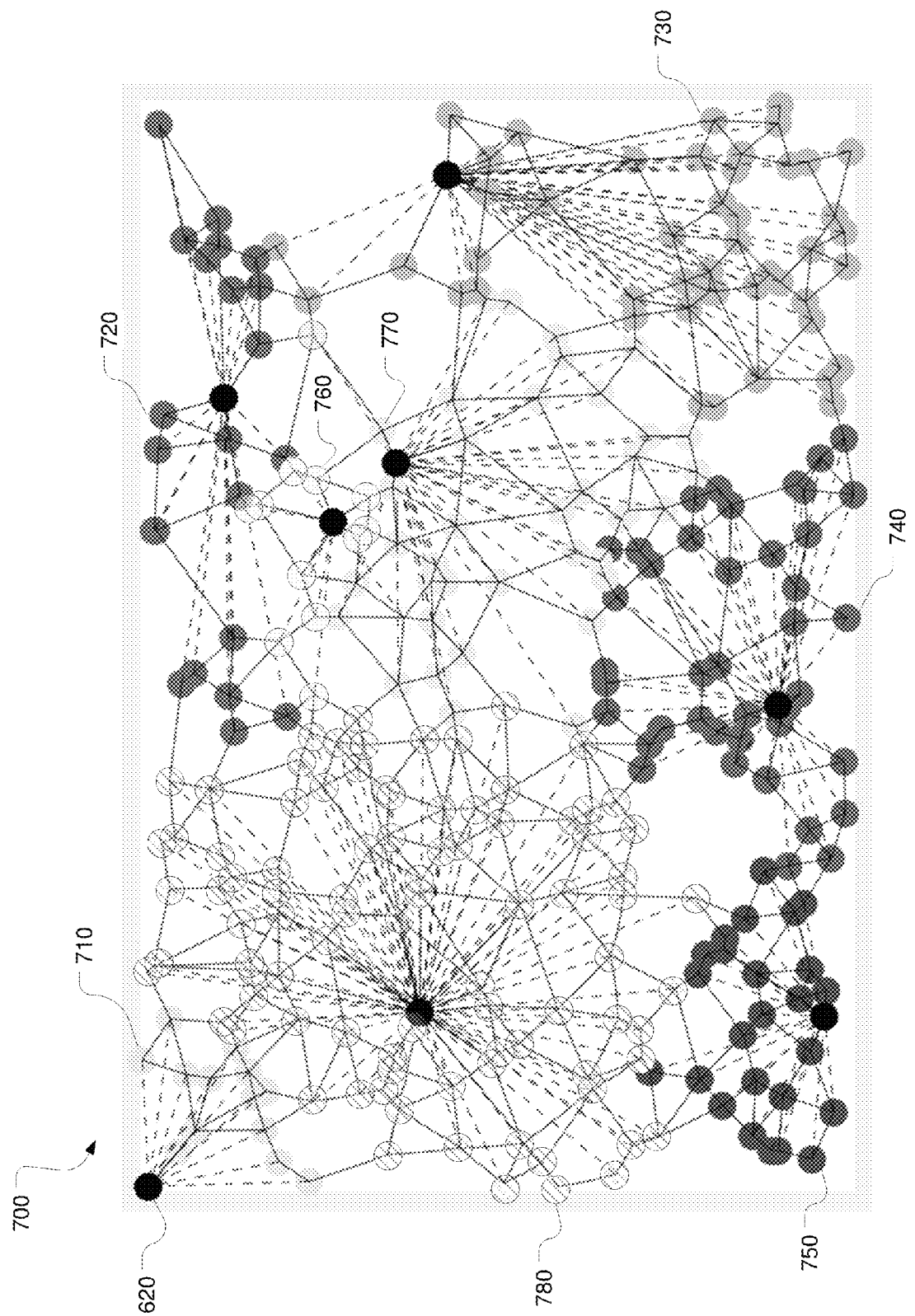
FIG. 7 is an illustration of geographic zoning results using a clustering heuristic approach.

FIG. 7 is an illustration of geographic zoning results 700 generated using an embodiment clustering heuristic approach. Zoning results 700 include eight geographic zones 710, 720, 730, 740, 750, 760, 770, and 780. The eight zones encompass all of the network nodes in the topology graph of FIG. 6. Controllers 620, also of FIG. 6, are assigned to the eight geographic zones. The zones are illustrated by the groups of variously shaded circles, representing the network nodes, and their incident links. Zoning results 700 also includes dashed lines between controllers 620 and each of their respective network nodes in their respective zones.

Figure 8:
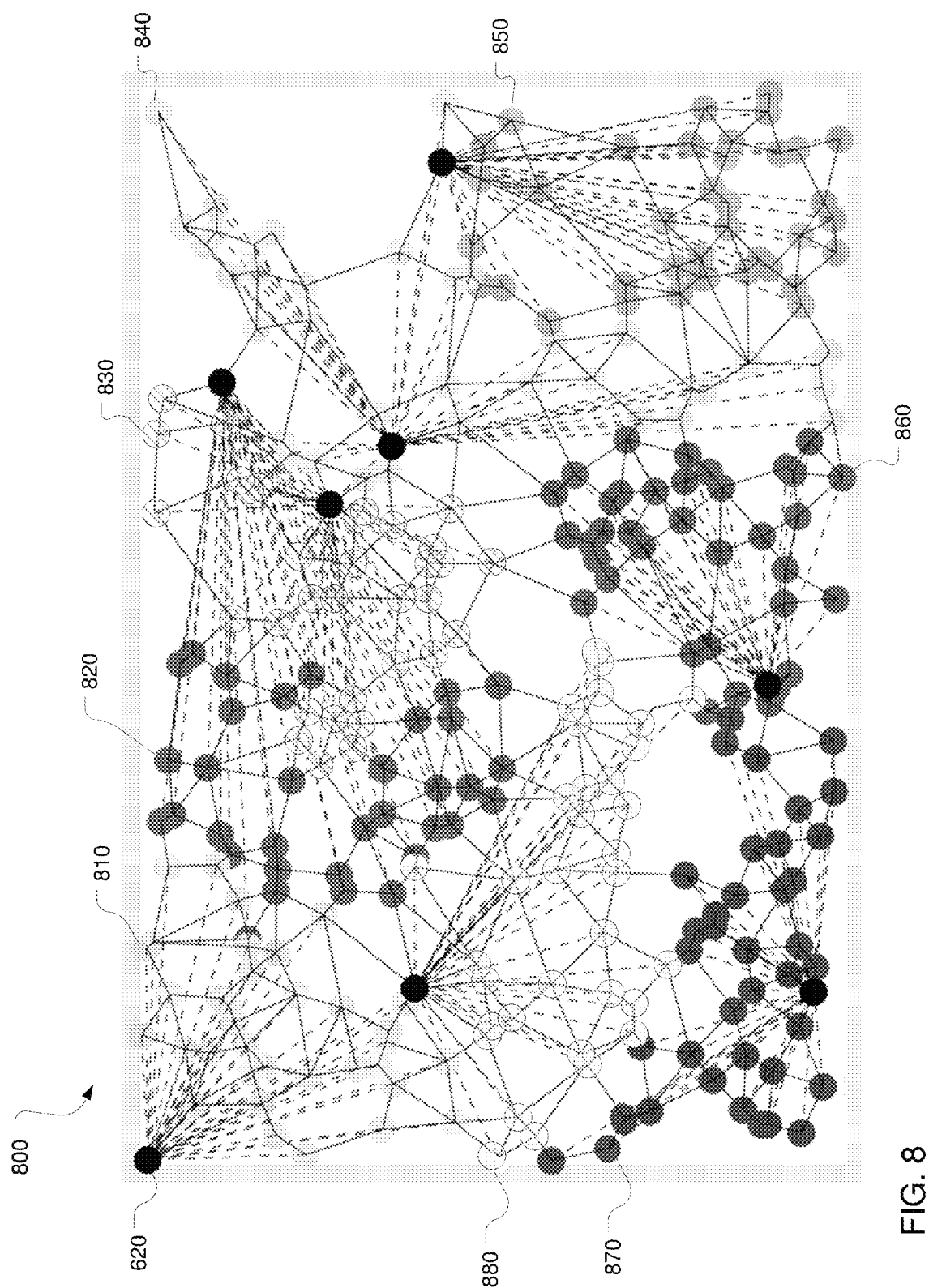
FIG. 8 is an illustration of geographic zoning results using a partitioning heuristic approach.

FIG. 8 is an illustration of geographic zoning results generated using an embodiment partitioning heuristic approach. Zoning results 800 include eight geographic zones, 810, 820, 830, 840, 850, 860, 870, and 880. The eight zones encompass all of the network nodes in the topology graph of FIG. 6. Controllers 620, also of FIG. 6, are assigned to the eight geographic zones. The zones are illustrated by the groups of variously shaded circles, representing the network nodes, and their incident links. Zoning results 800 also includes dashed lines between controllers 620 and each of their respective network nodes in their respective zones.

Figure 9:
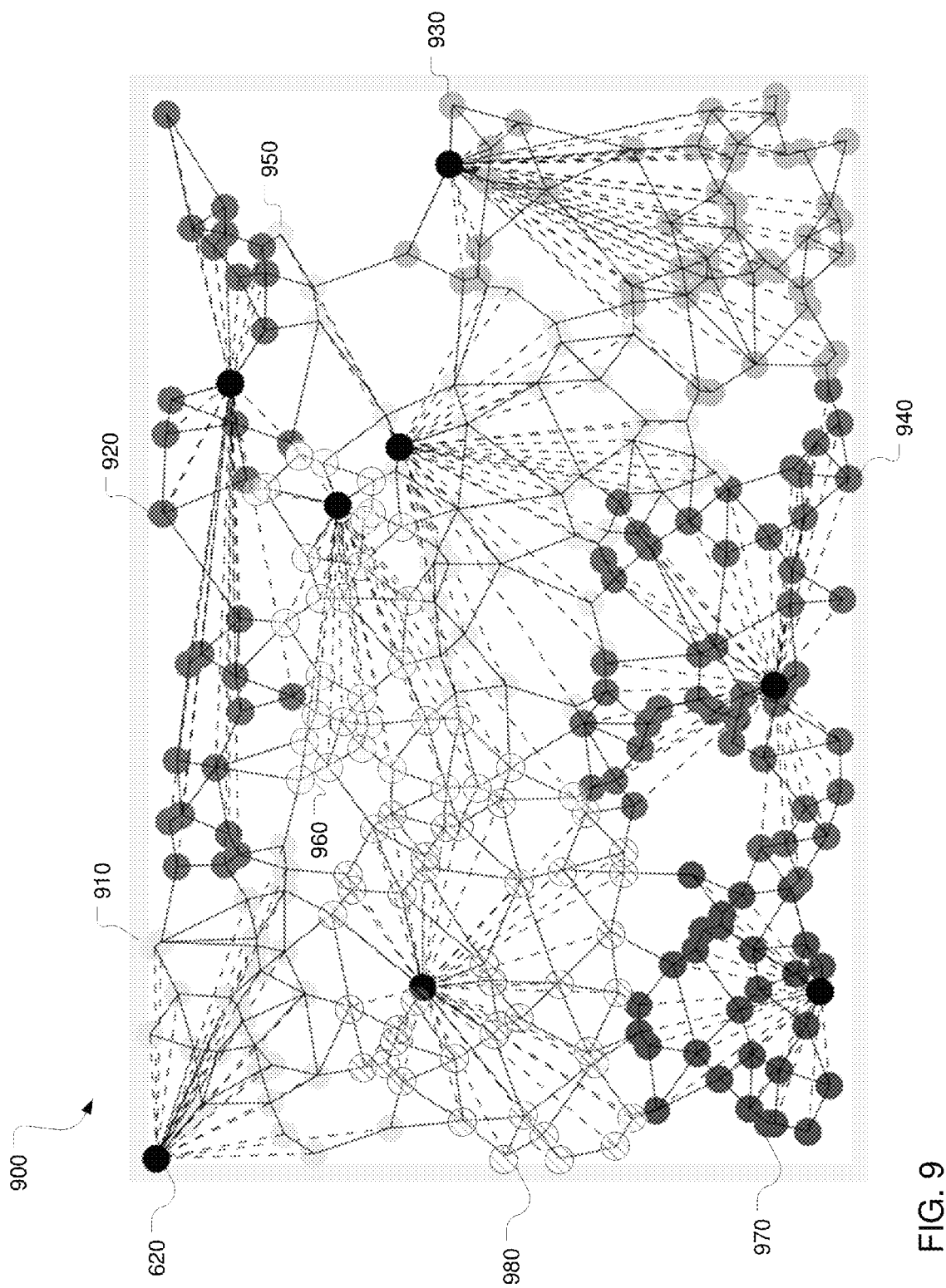
FIG. 9 is an illustration of geographic zoning results using a task assignment heuristic approach.

FIG. 9 is an illustration of geographic zoning results generated using an embodiment task assignment heuristic approach. Zoning results 900 include eight geographic zones, 910, 920, 930, 940, 950, 960, 970, and 980. The eight zones encompass all of the network nodes in the topology graph of FIG. 6. Controllers 620, also of FIG. 6, are assigned to the eight geographic zones. The zones are illustrated by the groups of variously shaded circles, representing the network nodes, and their incident links. Zoning results 900 also includes dashed lines between controllers 620 and each of their respective network nodes in their respective zones.

Figure 10:
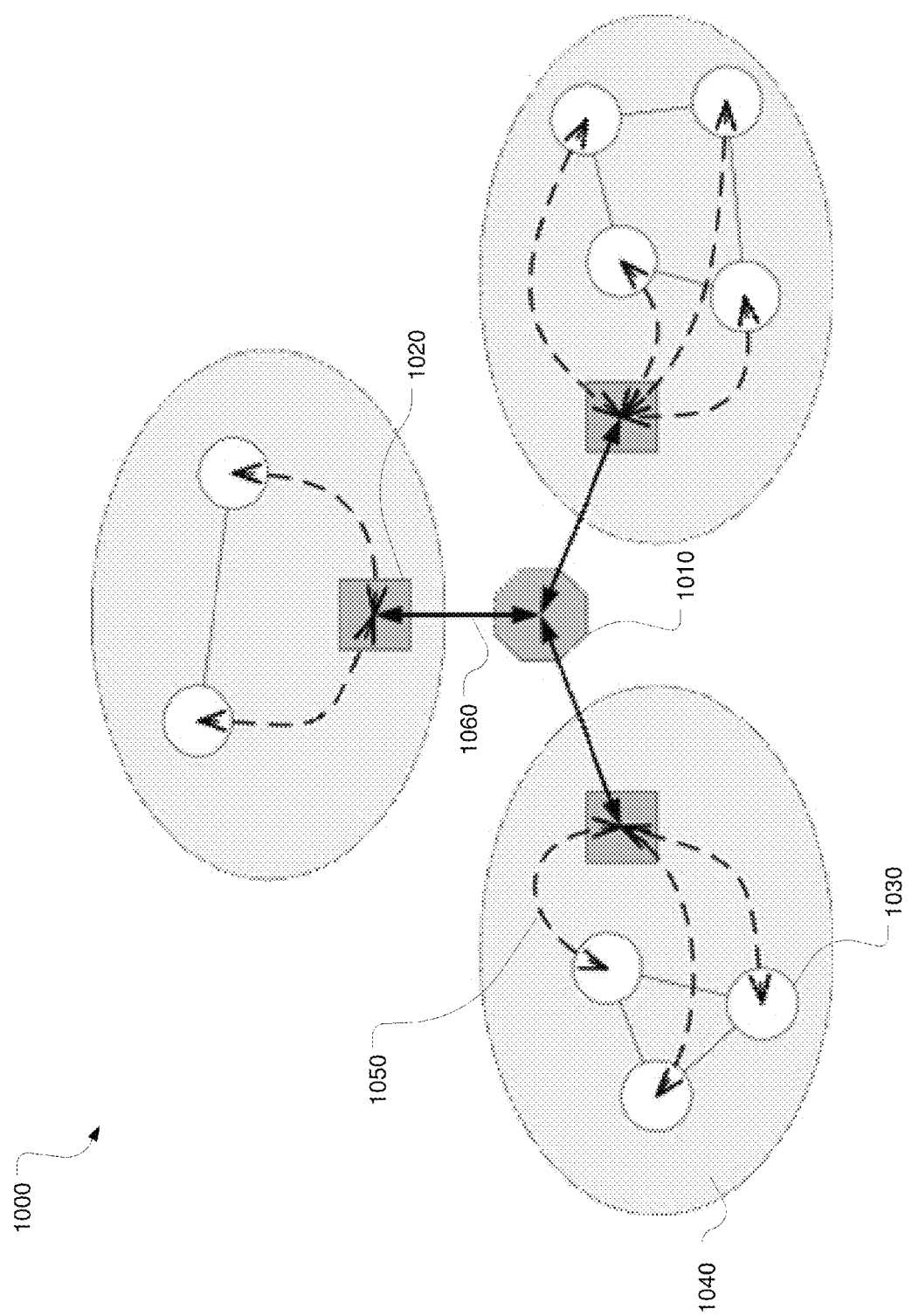
FIG. 10 is an illustration of a zone-based TE optimization problem.

FIG. 10 is an illustration of a zone-based TE optimization problem for an SDN 1000. SDN 1000 includes a master controller 1010, slave controllers 1020, and network nodes 1030. Rather than master controller 1010 solving the TE optimization problem, the TE optimization problem is decomposed into sub-problems that can be solved by slave controllers 1020. Each of slave controllers 1020 is assigned a zone 1040. Zones 1040 are formed such that overhead cost is minimized. Certain costs are confined to a particular zone. For example, node and link status collection and provisioning, represented by dashed lines 1050, are confined with each zone. While additional zones and slave controllers would spread those costs thinner, overhead costs associated with master-slave coordination, represented by solid lines 1060, increase with the addition of slave controllers.

Figure 11:
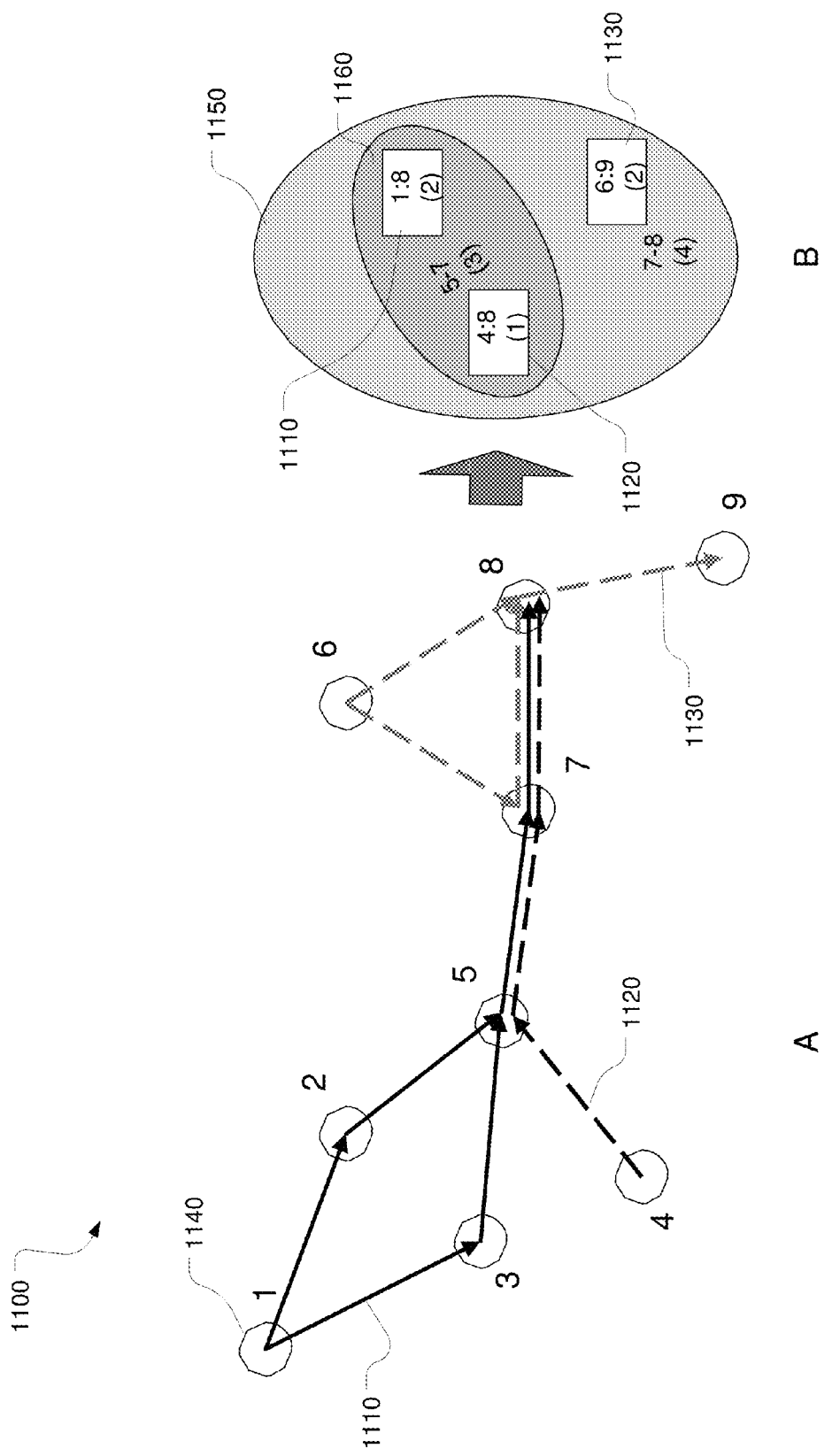
FIG. 11 is an illustration of flow graph construction.

FIG. 11 is an illustration of construction of a flow graph 1100-B according to a topology 1100-A. Topology 1100-A includes three traffic flows 1110, 1120, and 1130. The traffic flows variously traverse nine network nodes 1140, which are numbered 1-9. The first flow 1110 originates at node 1 and is destined for node 8. Traffic flow 1110 has two routing paths: 1-2-5-7-8 and 1-3-5-7-8. The second flow 1120 originates at node 4 and is also destined for node 8. Traffic flow 1120 has a single routing path: 4-5-7-8. The third flow 1130 originates at node 6 and is destined for node 9. Traffic flow 1130 has two routing paths: 6-7-8-9 and 6-8-9.

Flow graph 1100-B illustrates traffic flows 1110, 1120, and 1130 as white rectangles. Each of the traffic flows is assigned a weight, shown in parenthesis. Weight is the product of the number of candidate routing paths, i.e., the flow size, and the number of flows. In this example, the number of flows is one for each of traffic flows 1110, 1120, and 1130. Consequently, the respective weights of the traffic flows reflect the number of candidate routing paths. Flow graph 1100-B also illustrates a hyper-edge 1150 and a hyper-edge 1160. Hyper-edge 1150 represents the physical link between nodes 7 and 8, which is shared among all three traffic flows. Hyper-edge 1160 represents the physical link between nodes 5 and 7, which is shared between traffic flows 1110 and 1120. In this example, no other physical links are shared, nor are they represented in flow graph 1100-B. Hyper-edges 1150 and 1160 are also assigned weights that represent the number of candidate routing paths passing through the represented physical links. Hyper-edge 1150 has a weight of four, corresponding to the two routing paths for traffic flow 1110, the one routing path for traffic flow 1120, and the 6-7-8-9 routing path for traffic flow 1130. Similarly, hyper-edge 1160 has a weight of 3, corresponding to the two routing paths for traffic flow 1110 and the one routing path for traffic flow 1120.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of network zoning for a software defined network (SDN) having a plurality of network nodes, comprising:
   determining a number, K, of zones according to at least one zone quantity parameter;
   partitioning the plurality of network nodes of the SDN into K zones; and
   respectively assigning K SDN controllers to the K zones, wherein each of the K SDN controllers is configured to make traffic engineering decisions and carry out distributed network optimization for network nodes partitioned into the respective zone.

2. The method of claim 1 further comprising selecting a first group of K SDN controllers.

3. The method of claim 2 wherein the selecting is carried out concurrently with the respectively assigning.

4. The method of claim 2 wherein the selecting is carried out before the partitioning and before the respectively assigning.

5. The method of claim 4 further comprising re-selecting a second group of K SDN controllers concurrently with the respective assigning to replace the first group of K SDN controllers.

6. The method of claim 2 wherein the selecting comprises selecting the first group of K SDN controllers from a plurality of candidate SDN controllers according to respective inter-controller distances for the plurality of candidate SDN controllers, and wherein the selecting further comprises maximizing the respective inter-controller distances for the first group of K SDN controllers.

7. The method of claim 6 wherein the respective inter-controller distances comprise hop counts.

8. The method of claim 6 wherein the respective inter-controller distances are weighted.

9. The method of claim 1 wherein the at least one zone quantity parameter comprises at least one of a traffic engineering (TE) complexity, a network size, a traffic load and traffic flow information.

10. The method of claim 1 wherein the partitioning comprises dividing the SDN into geographic zones according to a heuristic algorithm, wherein the heuristic algorithm uses physical topology information to form the geographic zones.

11. The method of claim 10 wherein the partitioning further comprises forming the geographic zones according to a clustering heuristic algorithm.

12. The method of claim 10 wherein the partitioning further comprises forming the geographic zones according to a partitioning heuristic algorithm.

13. The method of claim 10 wherein the partitioning further comprises forming the geographic zones according to a task assignment heuristic algorithm.

14. The method of claim 1 wherein the partitioning comprises dividing the SDN into logical zones according to a heuristic algorithm, wherein the heuristic algorithm uses data flow information to form the logical zones.

15. The method of claim 14 wherein the partitioning further comprises forming the logical zones according to a task assignment heuristic algorithm.

16. The method of claim 14 wherein the partitioning further comprises forming the logical zones according to a graph partition heuristic algorithm.

17. The method of claim 1 wherein the partitioning is carried out before the respectively assigning.

18. The method of claim 1 wherein the partitioning is carried out concurrently with the respectively assigning.

19. A communication system, comprising:
   a plurality of network nodes among which a plurality of traffic flows traverse over links and for which a traffic engineering (TE) problem is defined;
   a plurality of controllers from which a subset of zone controllers is selectable;
   a zoning controller configured to:
      determine a size of the subset of zone controllers,
      select the subset of zone controllers,
      heuristically partition the plurality of network nodes into zones, and
      respectively assign the subset of zone controllers to the zones; and
   a master controller configured to decompose the TE problem into TE sub-problems corresponding to the zones, wherein the subset of zone controllers are configured to respectively solve the TE sub-problems for the zones.

20. The communication system of claim 19 wherein the subset of zone controllers are configured to provision network resources for the plurality of network nodes according to respective solutions for the TE sub-problems.

21. The communication system of claim 19 wherein the master controller is further configured to communicate with the subset of zone controllers to coordinate states of the TE sub-problems.

22. A zoning controller, comprising:
- a network interface controller (NIC) couplable to a plurality of SDN controllers and a plurality of network nodes via a control plane, wherein the plurality of network nodes is traversable by traffic flows over links via a data plane, and wherein a traffic engineering (TE) problem is definable for the plurality of network nodes, the traffic flows, and the links; and
- a processor configured for:
    - determining a size of a subset of zone controllers according to an expected TE complexity, a size of a network comprising the plurality of network nodes, and a traffic load comprising the traffic flows,
    - selecting the subset of zone controllers from the plurality of SDN controllers according to a controller topology, a network topology, and the traffic load,
    - partitioning a plurality of network nodes into zones, and respectively assigning the subset of zone controllers to the zones.

23. The zoning controller of claim 22 wherein the partitioning of the plurality of network nodes into zones is performed using a heuristic algorithm.

24. The zoning controller of claim 22 wherein partitioning the plurality of network nodes into zones includes minimizing an overhead cost associated with solving the TE sub-problems.

25. The zoning controller of claim 22 wherein partitioning the plurality of network nodes includes forming geographic zones according to physical topology information.

26. The zoning controller of claim 22 wherein partitioning the plurality of network nodes includes forming logical zones according to information about the plurality of traffic flows.

27. The zoning controller of claim 22 wherein the subset of zone controllers are configured to collect states for the plurality of network nodes and the links in their respective zones.

* * * * *